Figure 1:
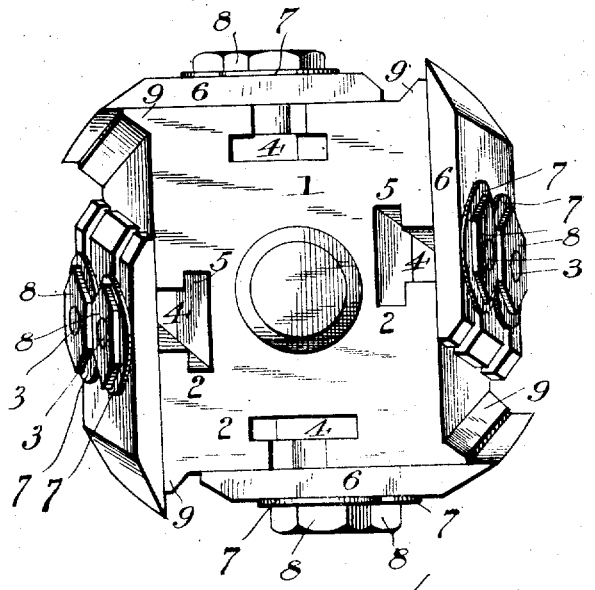

3 Sheets—Sheet 1

S. J. SHIMER.

CUTTER HEAD.

No. 11,616. Reissued June 29, 1897.

Witnesses:
Isaac L. Durand
Barnett Jones

Inventor:
Samuel J. Shimer;
by Louis Bagger & Co.
Attorneys.

S. J. SHIMER.

CUTTER HEAD.

No. 11,616. Reissued June 29, 1897.

Witnesses:
Frank L. Ouland
Emil H. Jone

Inventor:
Samuel J. Shimer,
by Louis Bagger & Co.
Attorneys.

3 Sheets—Sheet 3.

S. J. SHIMER.

CUTTER HEAD.

No. 11,616. Reissued June 29, 1897.

Witnesses:
Franck L. Durand
Samuel J. Jones

Inventor:
Samuel J. Shimer,
by Louis Bagger & Co.
Attorneys.

UNITED STATES PATENT OFFICE.

SAMUEL J. SHIMER, OF MILTON, PENNSYLVANIA.

CUTTER-HEAD.

SPECIFICATION forming part of Reissued Letters Patent No. 11,616, dated June 29, 1897.

Original No. 555,742, dated March 3, 1896. Application for reissue filed February 1, 1897. Serial No. 621,579.

DIVISION A.

*To all whom it may concern:*

Be it known that I, SAMUEL J. SHIMER, a citizen of the United States, and a resident of Milton, in the county of Northumberland and State of Pennsylvania, have invented certain new and useful Improvements in Cutter-Heads; and I do hereby declare the following is a full, clear, and exact description of the invention, that will enable others skilled in the art to which it appertains to make and use the same, reference being had to the accompanying drawings, and to the letters of reference marked thereon, which form a part of this specification.

The present application is for a reissue of the Letters Patent granted to me the 3d day of March, 1896, and for which I have also filed a divisional application of even date herewith, Serial No. 621,580.

My invention relates to rotary cutter-heads for planing-machines having four sides or faces, to which plane-surfacing knives are secured in such manner as to cause the cut to be made alternately from right to left and from left to right diagonally across the face of the board, which is caused to pass within the radius of the rotating head.

All surfaces formed by means of rotating cutter-heads are made up of innumerable incuts or waves upon the face-surface, noticeable in proportion to their minuteness, and it follows that the more varied the direction of the cut the more nearly uniform will be the surface.

The common form of cutter-head comprises four parallel sides, to which the planer-knives are fastened, so that the cutting edges will be in parallel lines with the axis of the head, and there will be but one straight cut made in the surface of the board by each knife on the head at each rotation of the cutter, irrespective of the rapidity with which the board is being fed into the line of the cut. The incut therefore will show in larger or smaller wavelets upon and across the face of the board. To avoid the making of such wavy surface, there have been planer-knives made upon a curve, which knives are secured to correspondingly-curved faces or seats on the cutter-head. These knives start the chip at one side of the board and follow it across the face thereof diagonally by as much as it was advanced by the feed during the making of the shear cut. These knives are very difficult to keep in order and are otherwise objectionable.

By my invention a shear cut is made in alternate opposite directions with flat planer-knives having curved cutting edges in the form of a segment of an ellipse, which are secured to a head having trapezoidal faces alternately arranged and alternately inclined inward and outward of the axial line of the head, so as to cut from right to left and from left to right diagonally across the face of the board, thereby lessening the tendency of chipping out lumber which is cross-grained and modifying the incuts on the surface made by a rotary cutter-head by a draw cut diagonally in alternately opposite directions.

Figure 2:
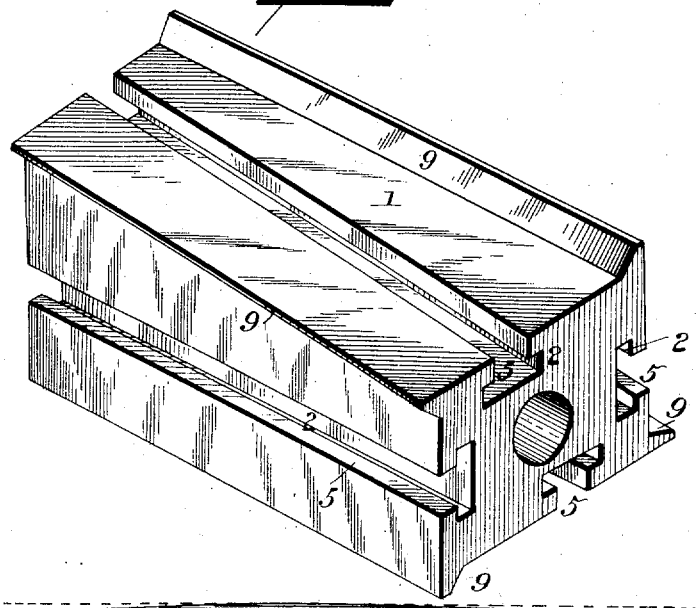
Figure 3:
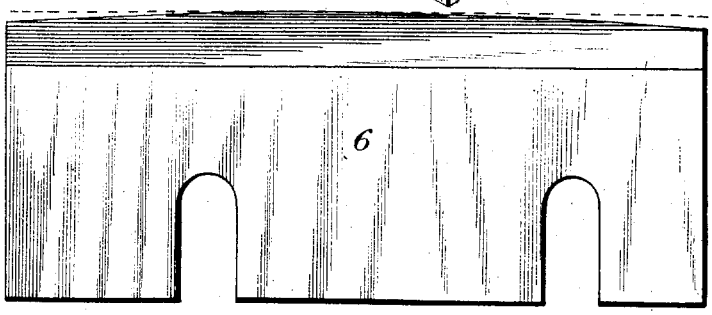
Figure 4:
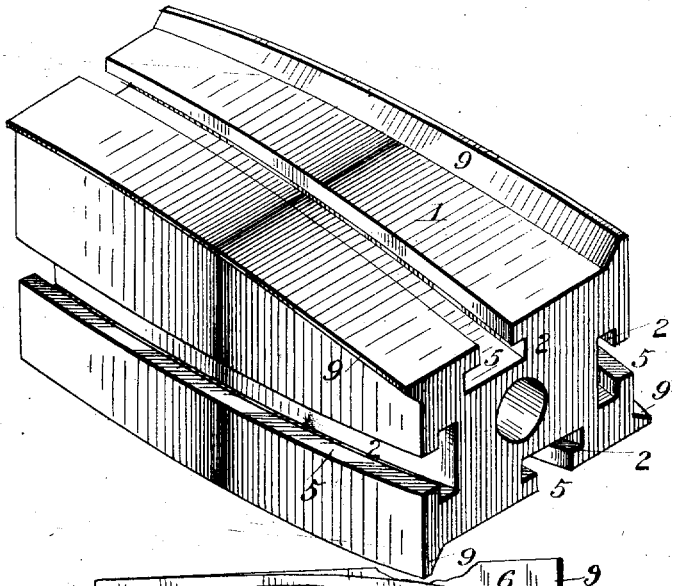
Figure 5:
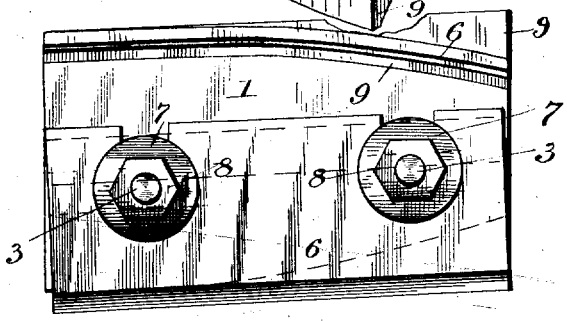

In the accompanying drawings, Figure 1 is an end view of a trapezoidal cutter-head made in accordance with my invention, showing the knives or blades secured thereto. Fig. 2 is a perspective view of the cutter-head, the knives being removed. Fig. 3 is a plan view of one of the knives removed from the head. Fig. 4 is a perspective view of a modification of the invention, the knives being removed. Fig. 5 is a front elevation of the same, one of the knives being in place.

In the said drawings, referring now to Figs. 1, 2, and 3, the reference-numeral 1 designates a rotary cutter-head having a central aperture for the mandrel by which it is rotated. This cutter-head has four trapezoidal faces alternately arranged and inclining inward and outward of the axial line of the head—that is to say, two opposite sides of the head are inclined from one end of the latter away from the axial line of the head, while the other faces or sides are inversely inclined or slanting from the same end of the head, they inclining toward the axial line of the head. Each of said sides or faces is formed with a T channel or groove 2, and working in these grooves are screw-bolts 3, having angular heads 4. These bolts pass through slots 5 in flat knives 6 and are provided with washers 7 and nuts 8. The numeral 9 designates beveled lips at the front edge of each side of the cutter-head and extending from end to end thereof. It will thus be seen that the knives are inclined or at an angle to the axial line of the head, and the said faces or sides of the latter being inclined in opposite directions and the cutting edges being curved in the form of a segment of an ellipse, so proportioned throughout their entire length as to lie within the surface of a cylinder of rotation. As the cutter-head is rotated the knives will alternately make a shear cut from right to left, and vice versa, diagonally across the face of the board.

In the modification shown in Figs. 4 and 5 the trapezoidal sides or faces instead of being flat, as shown in Figs. 1 and 2, are convexed longitudinally from end to end of the head. The knives in this instance are made with a straight cutting edge and are sprung down and bolted upon the head, assuming a concavo-convex shape, and the cutting edges will be convexed, so that every point thereof will be at the same distance from the center of the head. This construction, however, is claimed, specifically, in a divisional application of even date herewith, Serial No. 621,580.

From the above it will be seen that to make a perfectly true shear cut on the surface of the board with a trapezoidal cutter-head the knives thereof must have convex cutting edges.

In the construction last described the opposite faces of the cutter-head are convexed longitudinally on the arc of a symmetrically-disposed ellipse, while said faces on the transverse lines are straight and parallel with each other. That is to say, if a section be taken longitudinally through the head the outlines of said faces will appear as curved on a symmetrically-disposed ellipse and converging toward one end, while if a transverse section be taken at any point between the ends of the head the outlines will form a quadrangular polygon.

In Fig. 5 the parallel dotted lines near the center of the head show the line of the central opening in the head for the passage of the shaft or mandrel, while the single dotted line at the lower side of said figure indicates the elliptical face symmetrically disposed with the upper elliptical face with respect to the dotted lines representing the shaft or mandrel aperture or opening.

I do not claim herein any matter shown or described in said divisional application, Serial No. 621,580, and specifically claimed therein.

Having thus described my invention, what I claim is—

1. The combination with a cutter-head having four trapezoidal sides, alternately arranged and alternately inclined inward and outward with respect to the axial line of the head, of the blades formed with elliptical cutting edges so proportioned as to make the entire cutting edge of each knife lie within the surface of a cylinder of rotation whereby they will cut chips diagonally in opposite directions, from side to side across a plane board, substantially as described.

2. The combination with the cutter-head having four trapezoidal sides alternately arranged and alternately inclined inward to and outward from the axial line of the head, the said sides formed with T-shaped grooves, and also formed with beveled lips extending from end to end of the head, of the slotted knives formed with elliptical cutting edges so proportioned as to make the entire cutting edge of each knife lie within the surface of a cylinder of rotation whereby they will cut chips diagonally in opposite directions, from side to side across a plane board, substantially as described.

In testimony whereof I affix my signature in presence of two witnesses.

SAMUEL J. SHIMER.

Witnesses:
JOS. ANGSTADT,
BENNETT S. JONES.